(12) United States Patent
Howarth et al.

(10) Patent No.: US 10,837,368 B2
(45) Date of Patent: Nov. 17, 2020

(54) ACOUSTIC LINER AND METHOD OF FORMING AN ACOUSTIC LINER

(71) Applicant: MRA Systems, LLC, Baltimore, MD (US)

(72) Inventors: Graham Frank Howarth, Middletown, DE (US); David Patrick Calder, Baltimore, MD (US); Andrew Michael Roach, Aberdeen, MD (US)

(73) Assignee: MRA SYSTEMS, LLC, Baltimore, MD (US)

(*) Notice: Subject to any disclaimer, the term of this patent is extended or adjusted under 35 U.S.C. 154(b) by 461 days.

(21) Appl. No.: 15/442,177

(22) Filed: Feb. 24, 2017

(65) Prior Publication Data

US 2018/0245516 A1    Aug. 30, 2018

(51) Int. Cl.
| | | |
|---|---|---|
| *F02C 7/24* | (2006.01) | |
| *F02C 7/045* | (2006.01) | |
| *F02K 1/82* | (2006.01) | |
| *B64D 33/02* | (2006.01) | |
| *B32B 3/12* | (2006.01) | |
| *B32B 3/26* | (2006.01) | |

(Continued)

(52) U.S. Cl.
CPC ............... *F02C 7/24* (2013.01); *B32B 3/12* (2013.01); *B32B 3/266* (2013.01); *B64D 33/02* (2013.01); *F02C 7/045* (2013.01); *F02K 1/827* (2013.01); *B32B 2305/024* (2013.01); *B32B 2305/30* (2013.01); *B32B 2307/102* (2013.01); *B32B 2605/18* (2013.01); *B64D 2033/0206* (2013.01); *F05D 2250/283* (2013.01); *F05D 2260/96* (2013.01); *F05D 2300/40* (2013.01); *F05D 2300/612* (2013.01); *Y02T 50/60* (2013.01)

(58) Field of Classification Search
CPC ... F02C 7/24; F02C 7/045; B32B 3/12; B32B 3/266; B32B 2307/102; B64D 33/02; B64D 2033/0206; F02K 1/827; F05D 2250/283; F05D 2260/95; F05D 2300/40; F05D 2300/612; Y02T 50/672
See application file for complete search history.

(56) References Cited

U.S. PATENT DOCUMENTS

| | | | |
|---|---|---|---|
| 5,594,216 | A | 1/1997 | Yasukawa et al. |
| 6,087,407 | A | 7/2000 | Coronado et al. |

(Continued)

FOREIGN PATENT DOCUMENTS

| | | |
|---|---|---|
| CN | 106005445 A1 | 10/2016 |
| KR | 20120045689 A1 | 5/2012 |
| WO | 2014171590 A1 | 10/2014 |

OTHER PUBLICATIONS

International Search Report and Written Opinion issued in connection with corresponding PCT Application No. PCT/US2018/15377 dated May 9, 2018.

(Continued)

*Primary Examiner* — Nathaniel E Wiehe
*Assistant Examiner* — John S Hunter, Jr.
(74) *Attorney, Agent, or Firm* — Xsensus LLP

(57) ABSTRACT

An acoustic liner can comprise a support layer including a set of partitioned cavities defining a set of cells with open faces, as well as a first and second facing sheet operably coupled to the support layer that overlie and close the open faces. A set of aerogel fillings can be provided within at least some of the set of cells.

19 Claims, 8 Drawing Sheets

(51) Int. Cl.
*B32B 27/06* (2006.01)
*B32B 3/08* (2006.01)
*B32B 27/32* (2006.01)

(56) References Cited

U.S. PATENT DOCUMENTS

| | | | |
|---|---|---|---|
| 7,510,052 B2 * | 3/2009 | Ayle | F02C 7/045 |
| | | | 181/213 |
| 7,977,411 B2 | 7/2011 | Williams et al. | |
| 8,461,223 B2 | 6/2013 | Lee et al. | |
| 8,734,931 B2 | 5/2014 | Seth et al. | |
| 9,127,452 B1 * | 9/2015 | Winfield | B32B 5/022 |
| 9,290,274 B2 | 3/2016 | Roach et al. | |
| 2003/0134916 A1 | 7/2003 | Hrubesh | |
| 2005/0076644 A1 | 4/2005 | Hardwicke et al. | |
| 2008/0020176 A1 | 1/2008 | Ayle | |
| 2008/0092362 A1 | 4/2008 | Costa et al. | |
| 2009/0045009 A1 | 2/2009 | Chiou et al. | |
| 2012/0064287 A1 | 3/2012 | Park et al. | |
| 2012/0308369 A1 | 12/2012 | Maheshwari et al. | |
| 2014/0248116 A1 | 9/2014 | Ali | |
| 2014/0299712 A1 | 10/2014 | Waldrop, III et al. | |
| 2015/0165736 A1 | 6/2015 | Sattayatam et al. | |
| 2016/0084196 A1 | 3/2016 | Lee et al. | |
| 2016/0138212 A1 | 5/2016 | Joung et al. | |

OTHER PUBLICATIONS

Roach, A. M., et al., Acoustic liner having multiple layers, GE Co-Pending U.S. Appl. No. 15/442,158, filed Feb. 24, 2017.

* cited by examiner

ACOUSTIC LINER AND METHOD OF FORMING AN ACOUSTIC LINER

BACKGROUND OF THE INVENTION

Contemporary aircraft engines can include acoustic attenuation panels in aircraft engine nacelles to reduce noise emissions from aircraft engines. These acoustic attenuation panels generally have a sandwich structure that includes sheets enclosing a cellular honeycomb-type inner structure.

BRIEF DESCRIPTION OF THE INVENTION

In one aspect, an acoustic liner includes a support layer having a first side and a spaced second side and where the support layer includes a set of partitioned cavities extending between the first side and the second side, defining a set of cells, and where the set of partitioned cavities have open faces, a first facing sheet operably coupled to the support layer such that the first facing sheet overlies and closes the open faces on the first side, with a set of perforations included in the first facing sheet, and in fluid communication with cavities included in the set of partitioned cavities to form a set of acoustic resonators, and a set of aerogel fillings within at least some of the set of cells.

In another aspect, an aircraft engine assembly includes an aircraft engine, a nacelle configured to surround the aircraft engine and having an inlet section that defines an inlet open to ambient air and where the nacelle at least partially defines an annular airflow path through the aircraft engine assembly, and an acoustic panel operably coupled to at least one of the aircraft engine or the nacelle. The one acoustic panel includes a support layer having a first side and a spaced second side and where the support layer includes a set of partitioned cavities extending between the first side and the second side, defining a set of cells, and where the set of partitioned cavities have open faces, a first facing sheet operably coupled to the support layer such that the first facing sheet overlies and closes the open faces on the first side, with a set of perforations included in the first facing sheet, and in fluid communication with cavities included in the set of partitioned cavities to form a set of acoustic resonators; and a set of aerogel fillings within at least some of the set of cells and a second facing sheet operably coupled to the support layer such that the second facing sheet overlies and closes the open faces on the second side, wherein the first facing sheet is contiguous with the annular airflow path.

In yet another aspect, a method of forming a portion of an acoustic liner includes providing a support layer having a first side and a spaced second side and where the support layer includes a set of partitioned cavities extending between the first side and the second side, defining a set of cells, and where the set of partitioned cavities have open faces, at least partially filling at least some of the set of cells with a liquid aerogel to form a set of filled cells, curing the liquid aerogel in the set of filled cells.

DESCRIPTION OF EMBODIMENTS OF THE INVENTION

Figure 1:
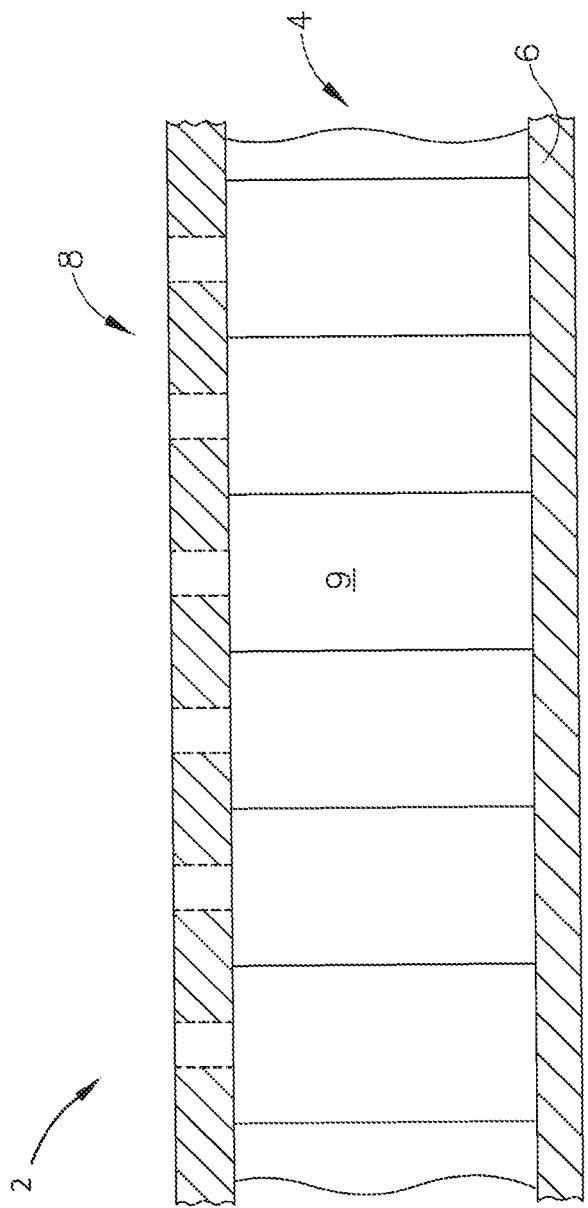
FIG. 1 is a sectional view of a prior art acoustic panel.

Contemporary aircraft engine and nacelle structures typically include acoustic attenuation panels having a perforated, acoustic facing skin. FIG. 1 shows a side view of a typical acoustic panel according to the prior art. The acoustic panel 2 includes an open framework 4 disposed between an imperforate backing sheet 6 and a perforated sheet or facing sheet 8. The open framework 4 forms a support layer having a set of partitioned cavities or cells 9 with open faces. Including that the open framework 4 has open faces on opposing front and rear sides of the open framework 4. In this manner, the open framework 4 forms a set of cells 9 in the open spaces between the open framework 4, the backing sheet 6 and the facing sheet 8.

Figure 2:
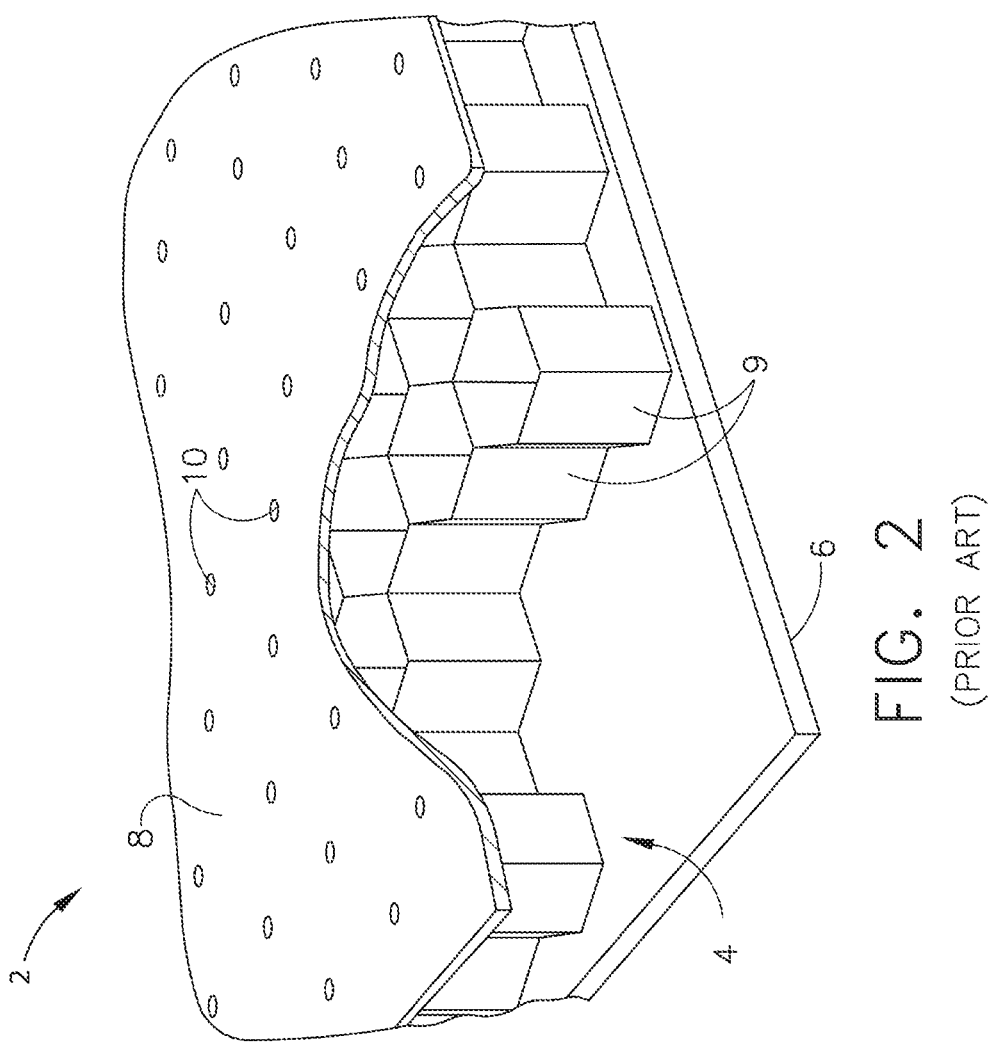
FIG. 2 is a perspective view of the acoustic panel of FIG. 1.

As illustrated more clearly in FIG. 2, the cells 9 formed by the open framework 4 disposed between the backing sheet 6 and the facing sheet 8 each have a predetermined volume defined by the geometry of the open framework 4 and the spacing between the backing sheet 6 and the facing sheet 8. The open framework 4 can include a honeycomb structure wherein the cells have six walls formed by the open framework 4, a bottom wall formed by the backing sheet 6 and a top wall formed by the facing sheet 8. The backing sheet 6 can be impervious with respect to air. More specifically, the backing sheet 6 can be an imperforate sheet supported by the support layer or open framework 4 on an opposite side of the open framework 4 than the facing sheet 8. In this manner, the imperforate sheet is on a back side of the open framework 4 and closes off the open faces on the back side.

The facing sheet 8 can be perforated such that a set of perforations 10, which form inlets, in a predetermined pattern are formed in the facing sheet 8 to allow air into selected cells 9. The facing sheet 8 can be supported by the open framework 4 such that perforations 10 are in overlying relationship with the open faces of the open framework 4 to form paired perforations 10 and cavities that define the acoustic resonator cells 9. The perforated sheet can be directly supported on the open framework 4. Alternatively, an intervening layer can be utilized. The facing sheet 8 can be formed from any suitable material including, but not limited to, a composite material. The perforations 10 can be identical in area or can vary in area in different zones of the perforated sheet. The backing sheet 6 and facing sheet 8 and open framework 4 can be formed such that there are no seams present in backing sheet 6 and facing sheet 8 and open framework 4.

Cells 9 can form a portion of an acoustic resonator. For instance, the area of the perforation 10 and thickness of the facing sheet 8 can define neck portions of Helmholtz resonators, and the volume of the cells 9 can define the cavity volume. The resonators can be tuned to attenuate predetermined frequencies associated with engine sounds entering the acoustic resonators; tuning can be done by multiple processes well understood by those practiced in the art of acoustic design. The honeycomb cells 9 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

The typical acoustic liner generally described above can accommodate only a portion of the broadband noise created by an aircraft engine. With the advent of higher bypass turbofan engines with larger, slower turning fans, the acoustic signature of the aircraft engine assembly has trended towards lower sound frequencies. Such an aircraft engine assembly creates broadband noise, including multiple frequency peaks. This is against an environment where there is a continued search for improved aircraft and engine performance requiring lower weight and also, in the case of engine nacelles, reduced thickness to optimize engine installation and reduce overall size and resulting aerodynamic drag. Aspects described herein include the use of perforations in the acoustic skin as well as an aerogel layer attached to the skin. As used herein, "aerogel" or "polyimide aerogel" can include any suitable aerogel materials configured, selected, or enabled to withstand the operating environment of the application, such as in a gas turbine engine.

Figure 3:
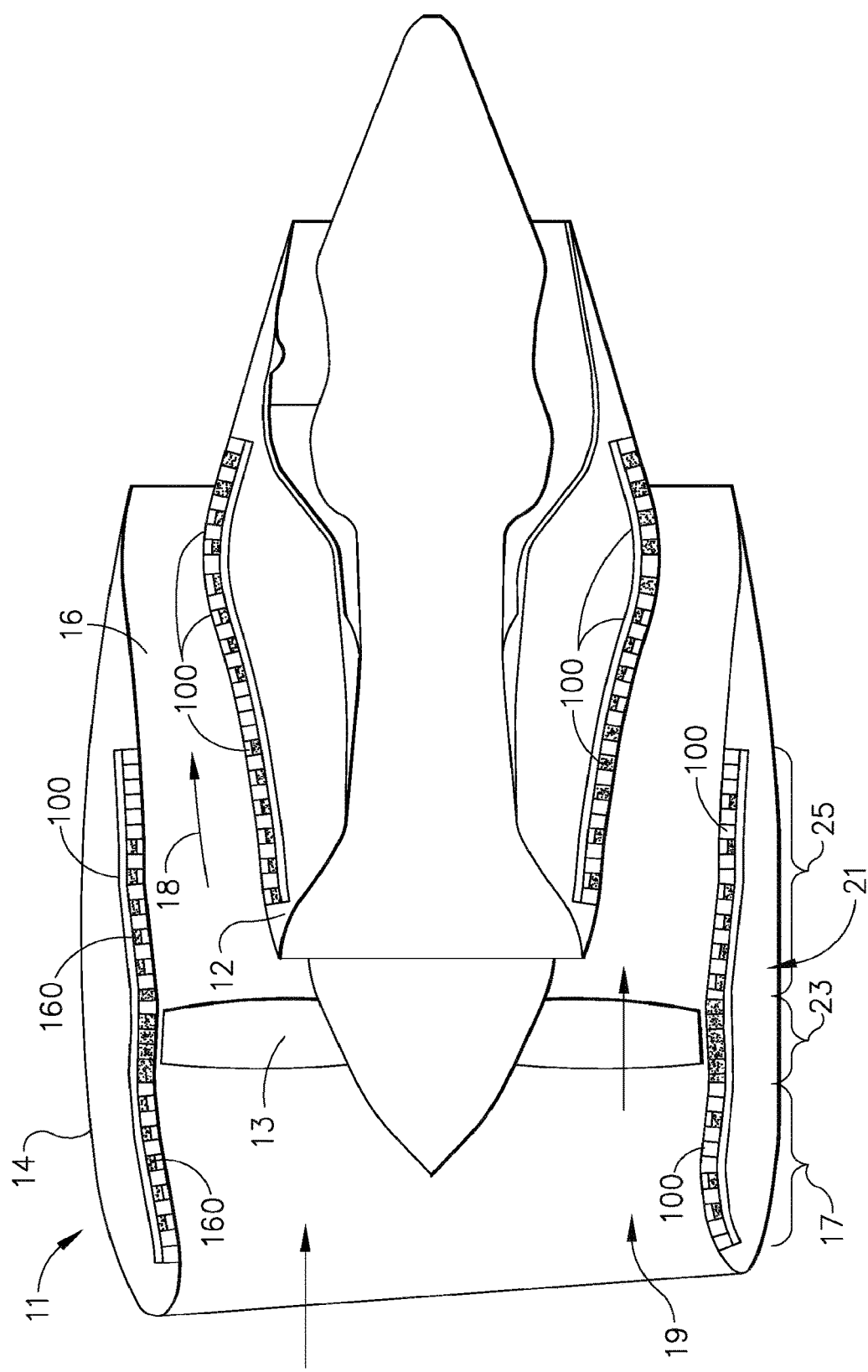
FIG. 3 is a schematic view of an aircraft engine assembly with a portion of the outer nacelle cut away for clarity.

It will be understood that acoustic liners or panels can be utilized in a variety of environments, including in building construction such as on walls, or in marine applications, and such environments are included in the present disclosure. By way of non-limiting example, FIG. 3 illustrates an exemplary environment of an aircraft engine assembly 11 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 11 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section 21 can be provided within the nacelle 14 wherein the fan section 21 is in fluid communication with the inlet 19. An annular acoustic panel (also referred to as an acoustic liner) 100 can be provided within at least a portion of the nacelle 14. By way of non-limiting example, the acoustic liner has been illustrated at the inlet 19, fan section 21, and aft duct 25. The acoustic liner 100 is configured to attenuate noise in the aircraft engine assembly 11 and defines the through air flow.

Figure 4:
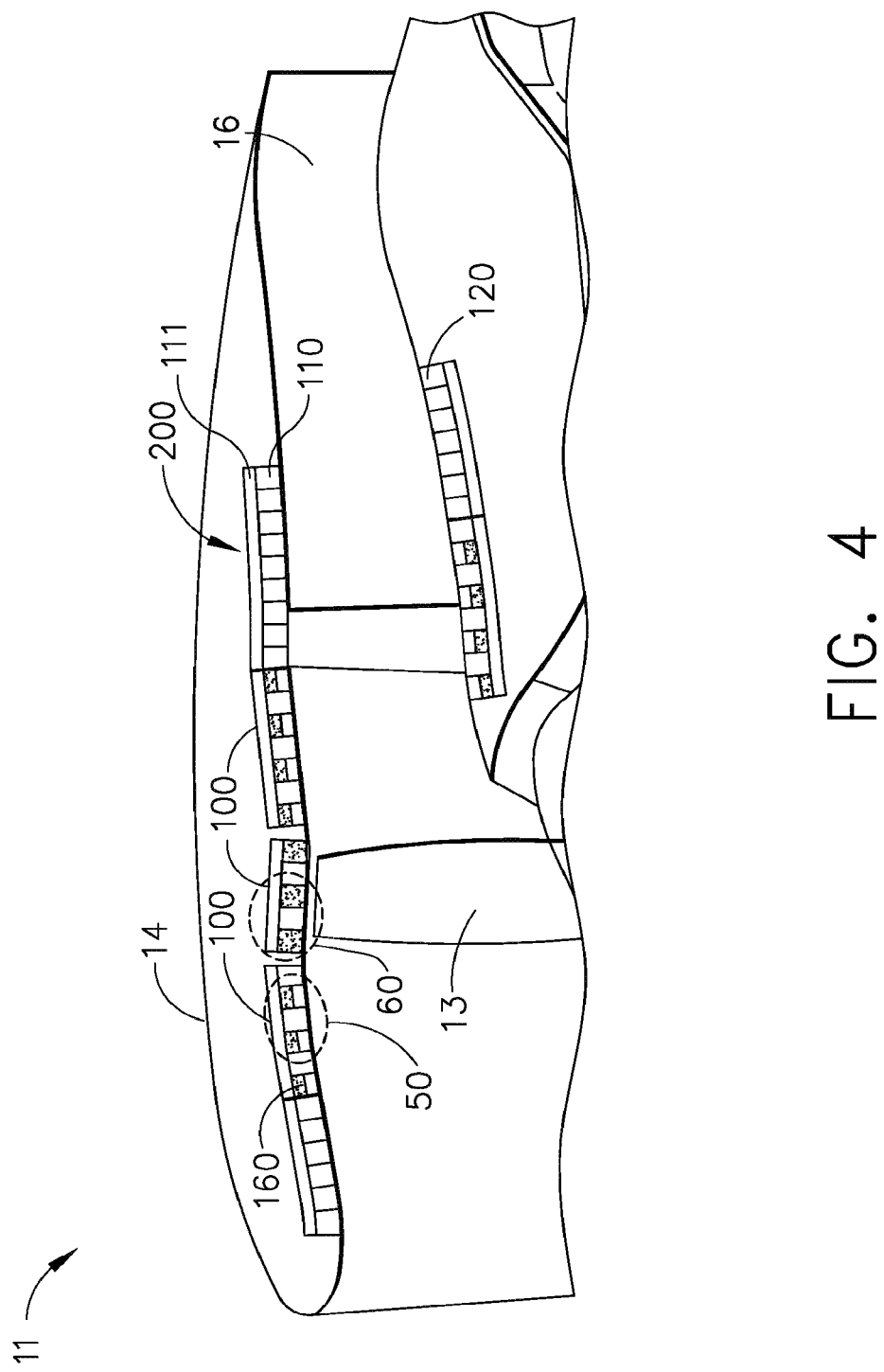
FIG. 4 is a side view of a portion of the aircraft engine assembly of FIG. 3 with an acoustic panel according to various aspects of the disclosure.

FIG. 4 illustrates a portion of the aircraft assembly 11 and more clearly illustrates that a set of cells or partitioned cavities 120 can be included in the acoustic liner 100. At least a portion of the cavities 120 can be filled with aerogel fillings 160 which will be described in further detail below. It is also contemplated that a second acoustic panel 200 in the aircraft assembly 11 can be devoid of aerogel fillings 160 as shown.

Figure 5:
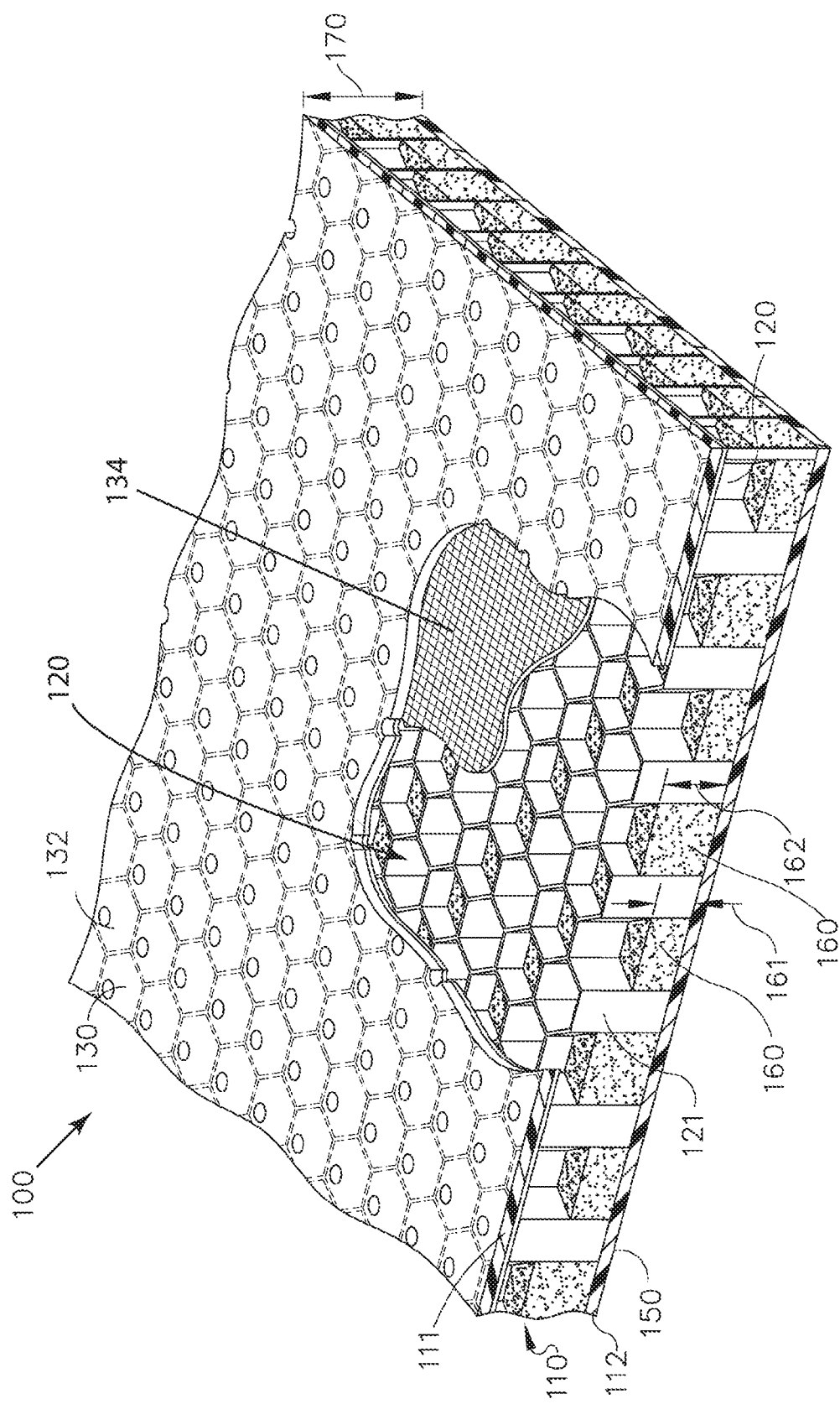
FIG. 5 is perspective view of the acoustic panel of FIG. 4 with portions removed for clarity.

FIG. 5 illustrates a perspective view of the acoustic panel with various portions cut away for better clarity. As illustrated, a support layer 110 having a first side 111 and second side 112, as well as a first facing sheet 130, a second facing sheet 150, and a membrane 134 can be included within the acoustic liner 100. The partitioned cavities 120 can be formed within the support layer 110 by an open framework 121 disposed between the second facing sheet 150 and the first facing sheet 130, where each cavity 120 can have a predetermined volume defined by the geometry of the open framework 121 and the spacing between the first and second facing sheets 130, 150. The open framework 121 can include a honeycomb structure wherein the cells have six side walls, a bottom wall formed by the second facing sheet 150 and a top wall formed by the first facing sheet 130. The first facing sheet 130 can include a first set of perforations 132 which can form inlets in the first facing sheet 130, allowing air into selected cavities 120. Further, the first set of perforations 132 can be in overlying relationship with the open faces of the open framework 121 to form paired perforations 132 and cavities 120. The second facing sheet 150 can be an imperforate sheet supported by the support layer or open framework 121 on an opposite side of the open framework 121 than the first facing sheet 130 and close off open faces of the cavities 120 on the back side.

The membrane 134 can be made from an oleophobic and hydrophobic material including, but not limited to, plastics such as PTFE, and has been illustrated as being positioned between the first facing sheet 130 and the support layer 110. The oleophobic/hydrophobic membrane 134 can prevent the absorption of liquids such as oil or water from the local airstream into the acoustic liner 100, the absorption of which can alter the frequency attenuating properties or hasten the material distress of the liner 100.

A set of aerogel fillings 160 can be included within at least some of the set of cavities 120. It will be understood that any number of the cavities 120 can include the aerogel fillings 160 including a single cavity 120 or all of the cavities 120. While the term "filling" is utilized it will be understood that the aerogel filling 160 may not completely fill the corresponding cavity 120. Regardless of whether the cavity 120 is fully filled or partially filled with aerogel fillings 160 it can be considered to be "filled" as opposed to being void of an aerogel filling.

Further, in instances where an aerogel filling 160 is included at least a portion of the cavity 120 can be filled. By way of non-limiting illustration, a first aerogel filling 160 is illustrated as having a first thickness 161 that corresponds to a first height and a second aerogel filling 160 is illustrated as having a second thickness 162 that corresponds to a second height. In this manner the thickness of the aerogel fillings 160 can be varied among the set of cavities 120. It is contemplated that a filling pattern may be used for the aerogel fillings 160; in non-limiting examples, the open framework 121 can contain alternating rows of filled and unfilled cells, or a repeating pattern of one empty row, one row filled with a first thickness 161, and one row filled with a second thickness 162, or any other desired filling pattern can be used in the acoustic liner 100. The exemplary filling pattern shown in FIG. 5 illustrates aerogel fillings 160 with alternating first and second thicknesses 161, 162 in adjacent cavities 120.

Figure 6:
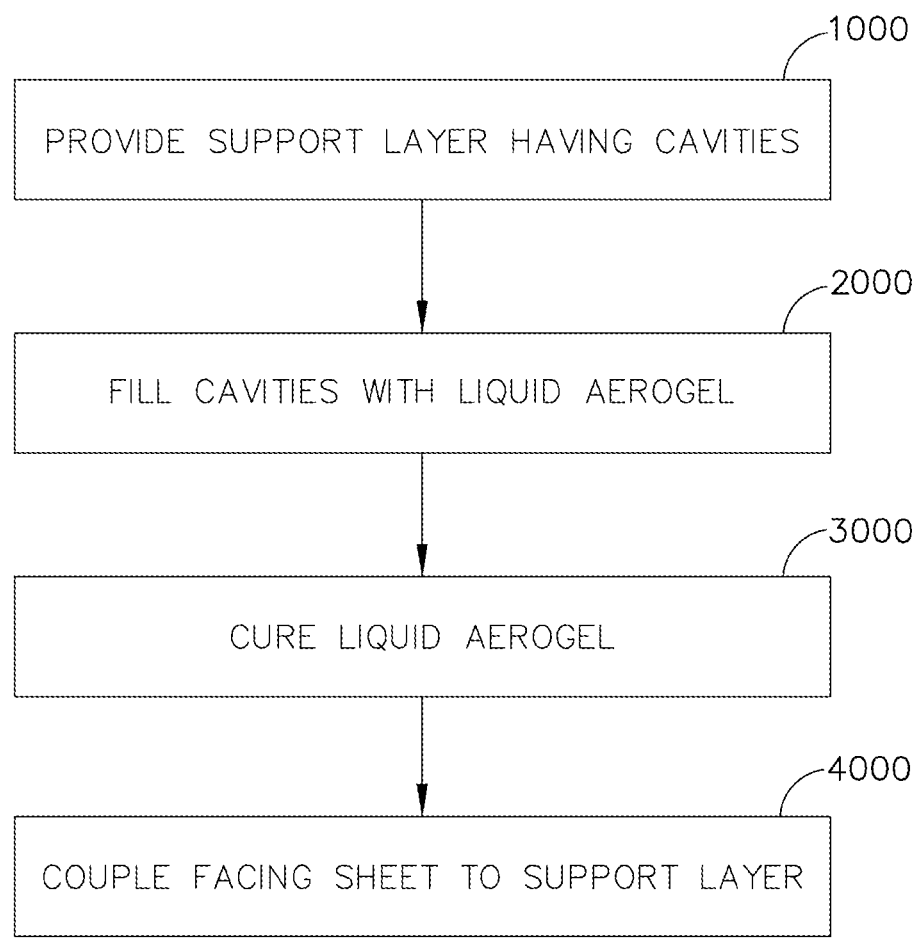
FIG. 6 is a flowchart illustrating a method of forming a portion of the acoustic panel of FIG. 4 having aerogel fillings according to various aspects described herein.

A method of forming a portion, such as the portion 50 of the acoustic liner 100 is illustrated in a flowchart in FIG. 6. In step 1000, the support layer 110 can be provided with the support layer 110, first side 111, second side 112, and cavities 120 defining cells. In step 2000, at least a portion of the cavities 120 can be filled with liquid aerogel to form the fillings 160. In step 3000 the liquid aerogel fillings can be cured inside of the cavities 120, and in step 4000 the first and second facing sheets 130, 150 can be coupled to the support layer 110 to close the faces of the cavities 120.

Figure 7:
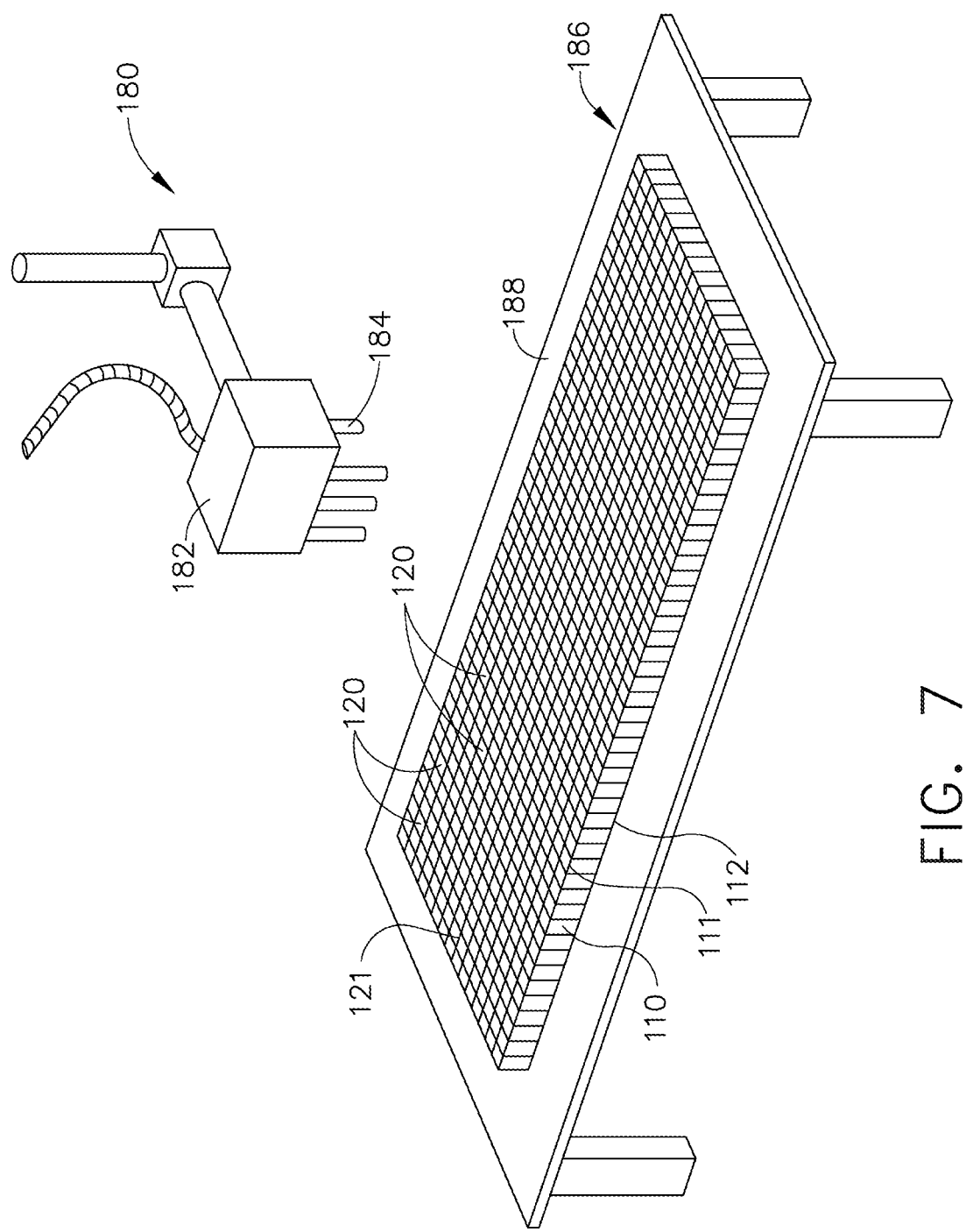
FIG. 7 is a perspective view of an apparatus for forming the acoustic panel of FIG. 4.

In FIG. 7, an apparatus for creating the aerogel fillings 160 is shown. The acoustic liner 100 may be provided with the support layer 110, first side 111, second side 112, and partitioned cavities 120, in addition to a support structure 186 which may include a surface 188 as shown. An injector 180 including a body 182 and a set of nozzles 184 can be used to inject liquid aerogel into at least a portion of the cavities 120; it should be understood that the support structure 186 and injector 180 may be of any type suitable for this purpose, and that any structure and/or machinery capable of such production is contemplated in the present disclosure. In addition, while illustrated schematically as a flat sheet, the support layer 110 can include other geometries or materials such as a formed coremat in a non-limiting example. It is contemplated that the injector 180 can have a pre-determined filling pattern such that the nozzles 184 can automatically inject measured amounts of liquid aerogel into the desired cavities 120, yielding pre-determined aerogel thicknesses 161 within the cavities 120, and further, that one pre-determined thickness in one cell may differ from another pre-determined thickness in a different cell. Once injected, the liquid aerogel fillings 160 can be cured within the cavities 120 in accordance with known aerogel manufacturing processes. The first facing sheet 130 or second facing sheet 150 can be coupled to the support layer 110 to form the acoustic liner 100.

Figure 8:
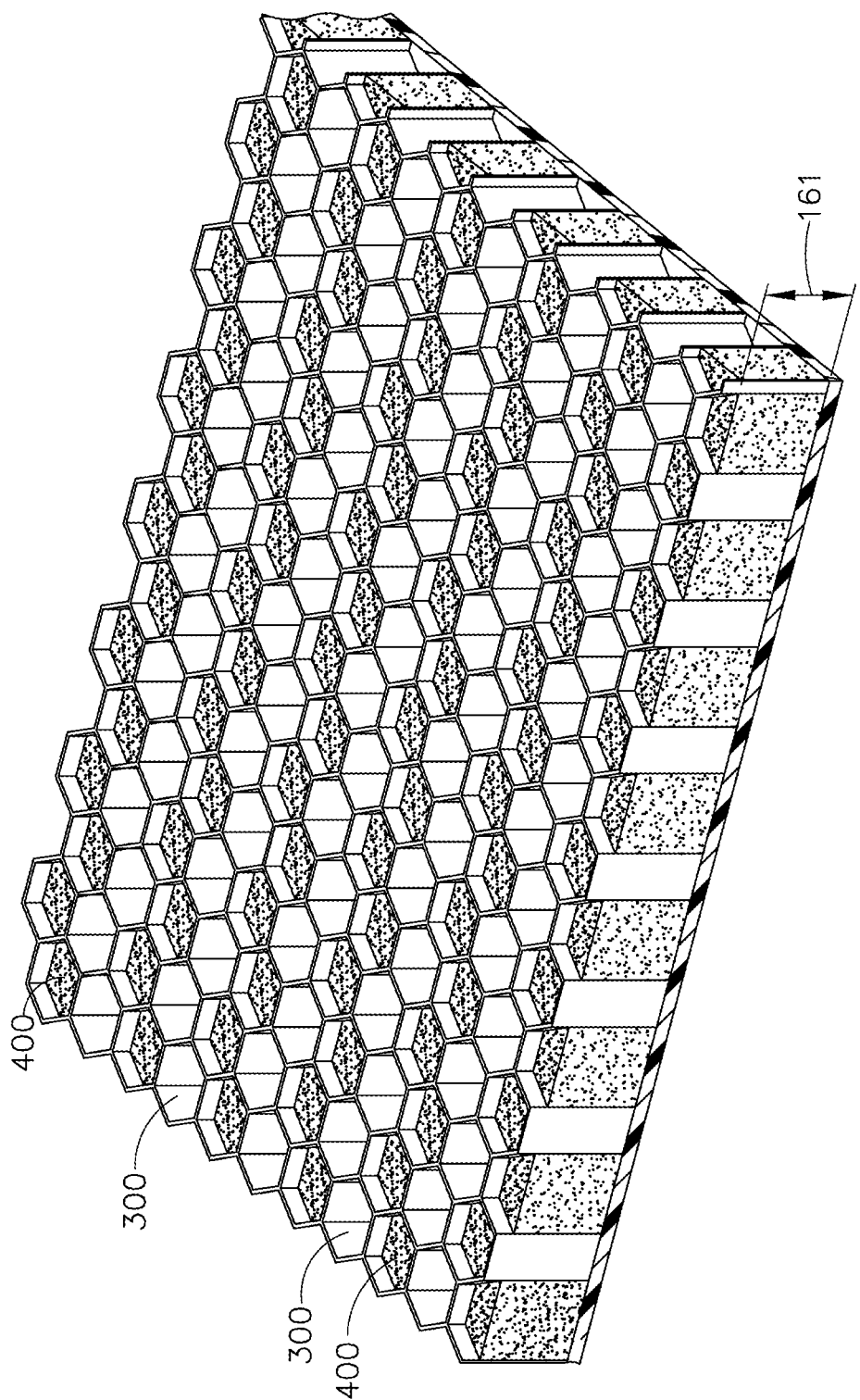
FIG. 8 is a schematic view of an exemplary filling pattern for the acoustic panel of FIG. 4.

FIG. 8 illustrates a non-limiting alternative filling pattern for the acoustic liner 100. The cavities 120 injected with liquid aerogel can form a set of filled cells 400 containing aerogel fillings 160 with first thicknesses 161, while cavities 120 that are not injected with liquid aerogel can form a set of unfilled cells 300 in alternating rows as shown. Any desired filling pattern is contemplated for use in the liner 100, including the use of a tapered fill pattern wherein a diameter of the aerogel filling 160 can be smaller than a diameter of the filled cell 400, or using aerogel to coat at least one sidewall of a cell in the support layer 110, in non-limiting examples. Additionally, it is contemplated that the filled cells 400 can have differing aerogel thicknesses in any desired pattern including completely filled, completely unfilled, partially filled, marginally filled wherein an aerogel thickness can be up to half of the height of the corresponding cell, or any combination thereof.

During operation, the cavities 120 can form a portion of an acoustic resonator, such as a Helmholtz resonator, with the first set of perforations 132 (FIG. 5) and first facing sheet 130 forming the smaller neck portions, the volume of the cavities 120 defining the cavity volume, and the second set of perforations 152 and second facing sheet 150 defining the larger neck portion. In a non-limiting example, the resonators can be tuned to attenuate predetermined frequencies associated with engine sounds entering the acoustic resonators. This can include broadband noise and include frequencies lower than 3000 Hz. The aerogel fillings 160 can further attenuate noise due to its large amount of free volume, rigid structure, large surface area, and low density; the free volume (also known as open cell content, porosity, or void fraction) of the aerogel can be 80% or higher as a non-limiting example. As a result of the improved sound attenuation provided by the aerogel fillings 160, the acoustic liner 100 can have a reduced total thickness 170 as compared to other known acoustic liners; it is contemplated that the acoustic liner 100 can have a total thickness 170 of up to 2.0 inches in the engine assembly 11. However, the disclosure is not so limited, and in stationary or marine applications the total thickness 170 can be several inches thick as desired.

Frequencies in the environment near the fan assembly 13 can vary from those farther away from the fan assembly 13 and sound attenuating properties of the acoustic liner 100 can be tailored to attenuate such varying frequencies. The aerogel filling thickness 161 can be one way of altering the sound attenuating properties of the acoustic liner 100. In a non-limiting example, a first portion 50 (FIG. 4) of the acoustic liner 100 farther from the fan assembly 13 can have a decreased aerogel thickness as compared to a second portion 60 positioned near the fan assembly 13, resulting in a different sound attenuation profile as desired in different regions of the engine assembly 11.

The aspects of the disclosure described above provide for a variety of benefits including that the use of aerogel can result in the attenuation of lower frequencies over a broader frequency range than what is presently achievable using traditional manufacturing materials (such as silica), as well as providing for a customizable sound attenuation profile at desired locations within the engine assembly. The injection process as described herein can be implemented with reduced cost, effort, and design compared to other methods of acoustic panel construction such as the use of septum layers within cells to increase sound attenuation. In addition, the improved sound attenuation from the aerogel fillings can allow for a reduction in cell height compared to typical acoustic panels that do not include aerogel, and therefore a reduction in total thickness 170 can occur while preserving the desired sound attenuation effects. It can be appreciated that a reduction in total thickness 170 can allow for less material to be used in construction of the acoustic liner 100 as well as reducing its weight, which can reduce the production cost of the liner 100. Additionally, the reduced total thickness 170 of the acoustic liner 100 can increase the available airflow diameter through the engine 11 and provide for better ducting, which can improve the efficiency of the engine 11.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An acoustic liner, comprising:
  a support layer having a first side and a spaced second side and where the support layer includes a set of partitioned cavities extending between the first side and the spaced second side, defining a set of cells, and where the set of partitioned cavities have open faces;
  a first facing sheet operably coupled to the support layer such that the first facing sheet overlies and closes the open faces on the first side, with a set of perforations included in the first facing sheet;

a second facing sheet operably coupled to the support layer such that the second facing sheet overlies and closes the open faces on the spaced second side; and a set of aerogel fillings within some of the set of cells, the set of aerogel fillings having different thicknesses between at least some of the set of cells, wherein each of the at least some of the set of cells includes a single aerogel filling, and wherein the different thicknesses of the set of aerogel fillings are tailored to attenuate different frequencies, and each single aerogel filling in the at least some of the set of cells is in direct contact with the second facing sheet.

2. The acoustic liner of claim 1 wherein the set of aerogel fillings comprise a set of cured aerogel fillings.

3. The acoustic liner of claim 1 wherein the support layer includes a honeycomb core.

4. The acoustic liner of claim 3 wherein alternating rows of the honeycomb core include the set of aerogel fillings separated by rows of the honeycomb that do not include the set of aerogel fillings.

5. The acoustic liner of claim 1 wherein a thickness of at least one of the set of aerogel fillings of a respective cell is equal to or less than half a height of the respective cell.

6. The acoustic liner of claim 1, further comprising an oleophobic and hydrophobic membrane located between the first facing sheet and the support layer.

7. The acoustic liner of claim 1 wherein the acoustic liner has a total thickness greater than 0 inches and equal to or less than 2.0 inches.

8. The acoustic liner according to claim 1, wherein each single aerogel filling in the at least some of the set of cells extends from the second facing sheet to a height above the second facing sheet corresponding to the different thicknesses.

9. The acoustic liner according to claim 1, wherein some of the partitioned cavities do not include aerogel fillings.

10. An aircraft engine assembly, comprising:
an aircraft engine;
a nacelle configured to surround the aircraft engine and having an inlet section that defines an inlet open to ambient air and where the nacelle at least partially defines an annular airflow path through the aircraft engine assembly; and
an acoustic panel operably coupled to at least one of the aircraft engine or the nacelle, the acoustic panel comprising:
a support layer having a first side and a spaced second side and where the support layer includes a set of partitioned cavities extending between the first side and the spaced second side, defining a set of cells, and where the set of partitioned cavities have open faces;
a first facing sheet operably coupled to the support layer such the first facing sheet overlies and closes the open faces on the first side, with a set of perforations included in the first facing sheet; and
a set of aerogel fillings of within some of the set of cells, the set of aerogel fillings having different thicknesses between at least some of the set of cells, wherein each of the at least some of the set of cells includes a single aerogel filling, and wherein the different thicknesses of the set of aerogel fillings are tailored to attenuate different frequencies; and
a second facing sheet operably coupled to the support layer such the second facing sheet overlies and closes the open faces on the spaced second side;
wherein the first facing sheet is contiguous with the annular airflow path and each single aerogel filling in the at least some of the set of cells is in direct contact with the second facing sheet.

11. The aircraft engine assembly of claim 10 wherein the set of aerogel fillings comprise a set of cured aerogel fillings.

12. The aircraft engine assembly of claim 10 wherein the support layer includes a honeycomb core and alternating rows of the honeycomb core include the set of aerogel fillings.

13. The aircraft engine assembly of claim 10 wherein a thickness of at least one of the set of aerogel fillings of a respective cell is equal to or less than half a height of the respective cell.

14. The aircraft engine assembly of claim 10, further comprising an oleophobic and hydrophobic membrane located between the first facing sheet and the support layer.

15. The aircraft engine assembly of claim 10 wherein the acoustic panel has a total thickness greater than 0 inches and equal to or less than 2.0 inches.

16. The aircraft engine assembly of claim 10, further comprising a second acoustic panel devoid of aerogel fillings.

17. A method of forming a portion of an acoustic liner, comprising:
providing a support layer having a first side and a spaced second side and where the support layer includes a set of partitioned cavities extending between the first side and the second side, defining a set of cells, and where the set of partitioned cavities have open faces;
providing a first facing sheet operably coupled to the support layer such the first facing sheet overlies and closes the open faces on the first side, with a set of perforations included in the first facing sheet;
providing a second facing sheet operably coupled to the support layer such the second facing sheet overlies and closes the open faces on the spaced second side;
at least partially filling at least some of the set of cells with a liquid aerogel to form a set of filled cells, wherein the set of filled cells include aerogels at different thicknesses between at least some of the set of filled cells, and wherein the different thicknesses of the set of aerogel fillings are tailored to attenuate different frequencies, and each single aerogel filling in the at least some of the set of filled cells is in direct contact with the second facing sheet;
curing the liquid aerogel in the set of filled cells; and
operably coupling the second facing sheet to the support layer such the second facing sheet overlies and closes the open faces on the corresponding side.

18. The method of claim 17 wherein the set of filled cells include aerogel at multiple depths within a single depth support layer.

19. The method of claim 17 wherein the filling at least some of the set of cells comprises automatically injecting measured amounts of liquid aerogel to yield pre-determined cell depths.

* * * * *